United States Patent [19]
Gray

[11] Patent Number: 5,641,260
[45] Date of Patent: Jun. 24, 1997

[54] SHAFT COUPLING DEVICE AND LOCKING MECHANISM

[76] Inventor: Stephen Jay Gray, 2304 Huntington Ln. #2, Redondo Bch, Calif. 90278

[21] Appl. No.: 422,074

[22] Filed: Apr. 13, 1995

[51] Int. Cl.⁶ .................................................. B65G 67/02
[52] U.S. Cl. ........................................... 414/401; 403/348
[58] Field of Search ................................. 414/396, 401, 414/584, 222; 403/348, 315, 319

[56] References Cited

U.S. PATENT DOCUMENTS

| | | | |
|---|---|---|---|
| 765,225 | 7/1904 | Colin | 403/348 X |
| 1,881,508 | 10/1932 | Gredell | 403/348 X |
| 4,191,503 | 3/1980 | Neff et al. | 414/584 X |
| 4,203,514 | 5/1980 | Hirai | 414/222 X |
| 4,457,737 | 7/1984 | Sharples | 403/372 X |
| 4,603,998 | 8/1986 | Bober et al. | 403/322 |
| 4,697,974 | 10/1987 | Eltoukhy | 414/401 X |
| 4,871,278 | 10/1989 | Gerlach et al. | 403/348 X |
| 5,109,971 | 5/1992 | Riner | 193/35 A |
| 5,304,019 | 4/1994 | Wendling | 403/274 |
| 5,333,963 | 8/1994 | Blumenrath | 403/301 |
| 5,340,260 | 8/1994 | Turra et al. | 414/401 X |
| 5,441,376 | 8/1995 | Napierkowski et al. | 414/401 |
| 5,496,323 | 3/1996 | Dye | 403/348 X |

FOREIGN PATENT DOCUMENTS

| | | | |
|---|---|---|---|
| 2841554 | 4/1980 | Germany | 403/348 |

*Primary Examiner*—David A. Bucci

[57] ABSTRACT

A shaft coupling mechanism having a concentric alignment pin and a pivoting cylinder with a latch pin that acts as a shaft end stop and coupling latch, when a second shaft is engaged. Pivoting latch pin enters a slot mounted on the secondary shaft locking the two shafts together. This device pertains to the quick release locking mechanism for securely fastening or joining two mechanically supported shafts so loads or pallets can be transferred from one shaft to the other. This device is of most value to load carrying devices (pallets) that incorporate the use of "open" linear bearings. A secondary application of this device is for the coupling of a mobile cart, also with linear shafts to a machine center for the removal and storage of palletized fixturing.

4 Claims, 5 Drawing Sheets

SECTION I-I

SHAFT COUPLING DEVICE AND LOCKING MECHANISM

BACKGROUND OF THE INVENTION

This invention relates to a locking and alignment mechanism for coupling a shaft into another for the safe off loading of a pallet or other "open type" linear bearing guided device. The coupling to which the invention pertains is of type to fixedly secure the two shafts to each other in alignment, and to allow, quick disassembly of the coupling in order to disconnect the shafts. The coupling of this type is used in applications where disconnection of an otherwise solid shaft train is required.

Typical application of a coupled shaft mechanism like this is on assembly or machining equipment where fixtures or tools must be removed for storage. Typically these fixtures are positioned and held in place with linear bearings mounted to the base of a pallet.

Mechanism prevents the load from coming off the shaft until the second shaft is perfectly joined with primary shaft and locked into place, preventing the load from accidentally falling off equipment or mobile transfer cart.

Shafts must be perfectly aligned for the linear bearing to pass over the connection of one shaft to the other. The mechanism, because the bearing passes over it also, must match in size and be aligned (concentrically) to the primary shafts diameter.

An ideal application, but not limited to, for this mechanism is in the removal of a pallet table on vertical milling machines with pallet changers. These units keep the pallet on linear bearing ways that facilitate the changing of the pallet into the machining center of the mill. Often it is beneficial to replace the pallet with another that is specific to a tooled job. This device allows for a portable pallet change cart to connect to the linear shafts on the machines work surface or pallet staging area, lock the cart shafts to the permanent shafts or the equipment and off load the pallet so it can be moved to storage.

There are many possible ways of connecting shafts, but each have their deficiencies. The typical ways include; a) press fitting; b) set screws, c) using tapered connections; d) use of collets e) bolting shafts together with bracket; f) use of stanchions to prevent the shafts from separating while the load or pallet is being transferred from one shaft to the other; etc.

Sighting the work of Eric Wendling, U.S. Pat. No. 5,304,012 whose coupled shaft design primarily intended for use on drive shafts, is not intended for external shaft alignment, hence preventing a linear bearing from passage over the coupling.

Fred Blumentrath, U.S. Pat. No. 5,333,963 has similar limitations with his shaft coupler.

The inventors in U.S. Pat. No. 4,603,998 successfully demonstrated locking the two shafts together, however, their method also is for internal alignment without consideration of passing a bearing over the coupling.

Other methods of locking two shafts together include threading one shaft into the other or splining one end (as presented in U.S. Pat. No. 5,304,012 and in previously sited U.S. Pat. No. 5,333,963) using a set screw to lock them together. Because the shafts on equipment sited in this application are held vertically by stanchions or posts the shafts can not be rotated for threading or aligning the sprocket teeth. In addition, these other methods work well for their applications, but don't do the dual purpose of preventing the pallet from coming off the shaft when the shafts are not engaged.

Also to be taken into consideration, these methods are both time consuming and difficult to perform when removing pallets off machining centers or assembly apparatus.

To further demonstrate the inferiority of these alternatives, all of the previous art permits the equipment operator to forget to lock the shafts together. In this instance, the shafts could potentially separate during the transfer of the load, resulting in a out of balance weight condition on the cart causing it to topple or droppage of the load where someone might get injured. In the same context, they could leave the mechanical stop out of position, allowing the load or pallet to fall off during transport causing personal injury or damage to property.

This invention requires the equipment operator to lock the shafts together before the load can be removed from the equipment. To disengage the shafts they must unlock the shafts, hence positioning the latch pin in a locked position, as a end of shaft stop, to keep the load or pallet on the appropriate shaft.

SUMMARY OF THE INVENTION

The need to couple two shafts, linearly, is common place and there are many ways to do so. This invention presents a new and unthought of approach to coupling two identical shafts so they are locked together, easily disengaged and safe for holding a linear bearing guided load or pallet when uncoupled.

A key element to this approach is the method of latching the two shafts together. A pivoting cylinder is placed at the end of one of the shafts. Said cylinder pivots around a alignment pin that is pressed into the end of the primary shaft.

A latch pin is installed in the side of the pivoting cylinder, as the cylinder is rotated the latch pin enters a slot cut into a block installed on the end of the secondary cylinder. The slot is positioned so the two shafts have little clearance between them when the latch pin is engaged in the slot.

Said latch pin has a secondary function, which gives this idea it's unique advantage. When the two shafts are not engaged the latch pin, being held in place by a spring action locking pin through pivoting cylinder, acts as a end of shaft stop. The load, being held on the shaft with "open style" linear bearings, can not pass by the latch pin. This is an automatic safety device that allows for off loading the equipment only when a receiving shaft is properly coupled to the primary shaft.

Uses of this idea include, but are not limited to, mobile carts or lifts that can be coupled to the shafts on machining centers or assembly equipment for the removal or replacement of tooling or fixtures so they can be transported to storage or used on other machines within the facility.

These and other objects of this invention will become obvious to those skilled in the art relating to such equipment upon reading the following specification in conjunction with the accompanying drawings.

DETAILED DESCRIPTION OF THE DRAWINGS

Figure 1:
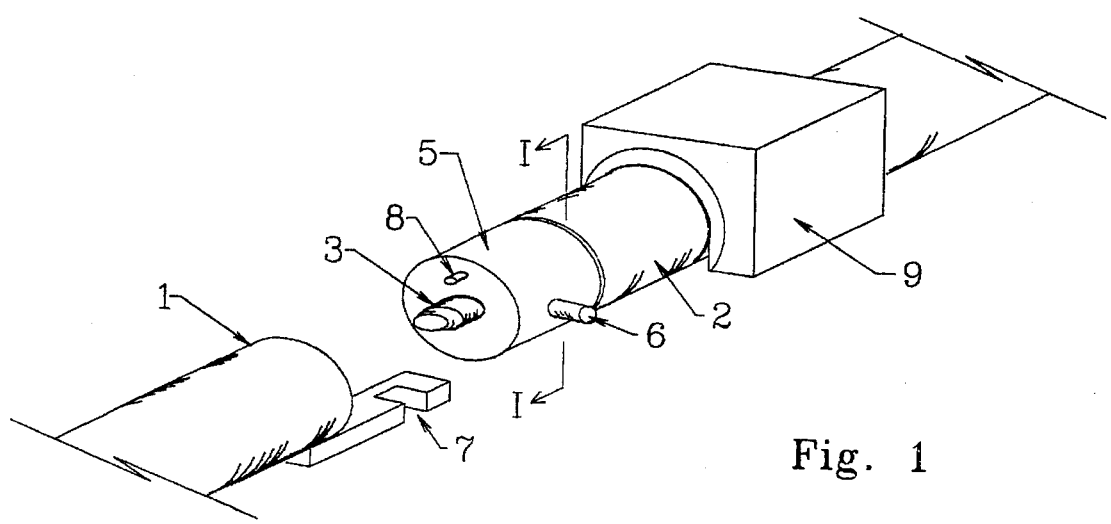
FIG. 1 is a view of the two shafts (unjoined) showing the alignment pin and unlock pin.

The construction comprises essentially of an alignment pin (3), best shown in FIG. 1, installed in the center of primary shaft (2) end, to position the two shafts concentrically. The receiving shaft (1), as seen best in FIG. 2, has a hole (4) to receive the alignment pin (3) at it's radial center. A latch bracket 17! is mounted on the base side of the receiving shaft (1) for receiving the latch pin (6), to be discussed in more detail in following description. Once the two shafts (1) and (2) are securely joined the load can be transferred, moved and stored.

Figure 3:
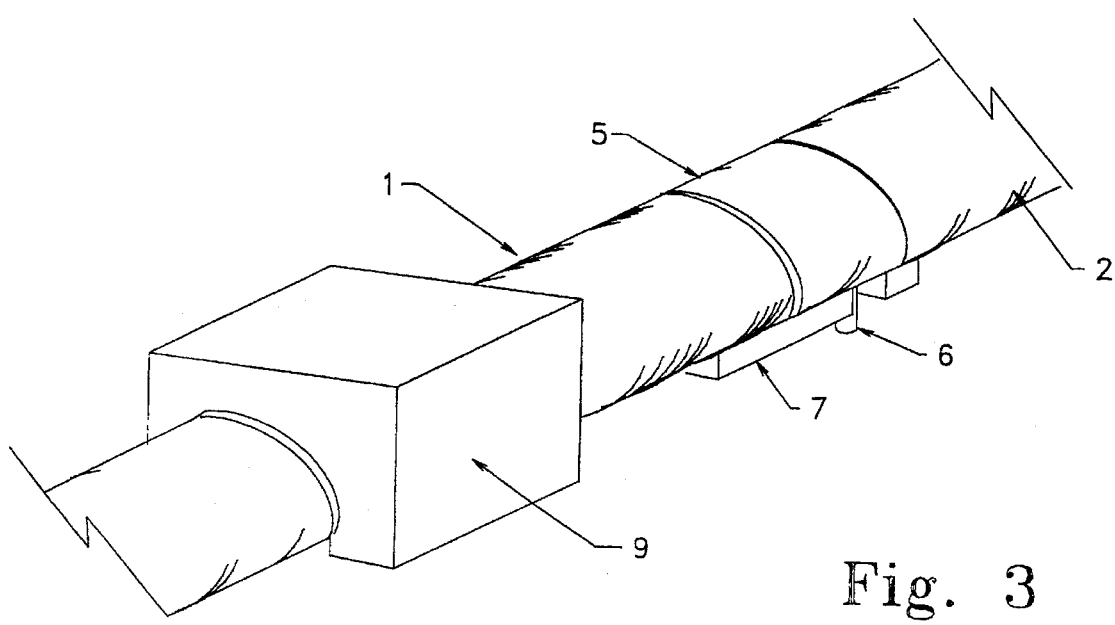
FIG. 3 shows the two shafts linearly joined and locked.

Around the alignment pin (3) is a pivoting cylinder (5) that includes a latch pin or arm (6) herein referred to as latch pin, as cylinder (5) is rotated around the alignment pin (3), the latch pin (6) slips into the bracket (7) on the receiving shaft (1) and locks the two shafts together, as shown in FIG. 3. When the latch pin (6) is in the "locked" position, both it and the receiving latch bracket (7) are centered so the "open" portion of the linear bearing (9) can pass by. This allows the palletized linear bearing guided load to be moved from one supported shaft to the other.

NOTE: A "OPEN-TYPE" linear bearing (9) is specifically designed with a slot at the base of the bearing so the bearing can pass over the shaft supports.

Figure 2:
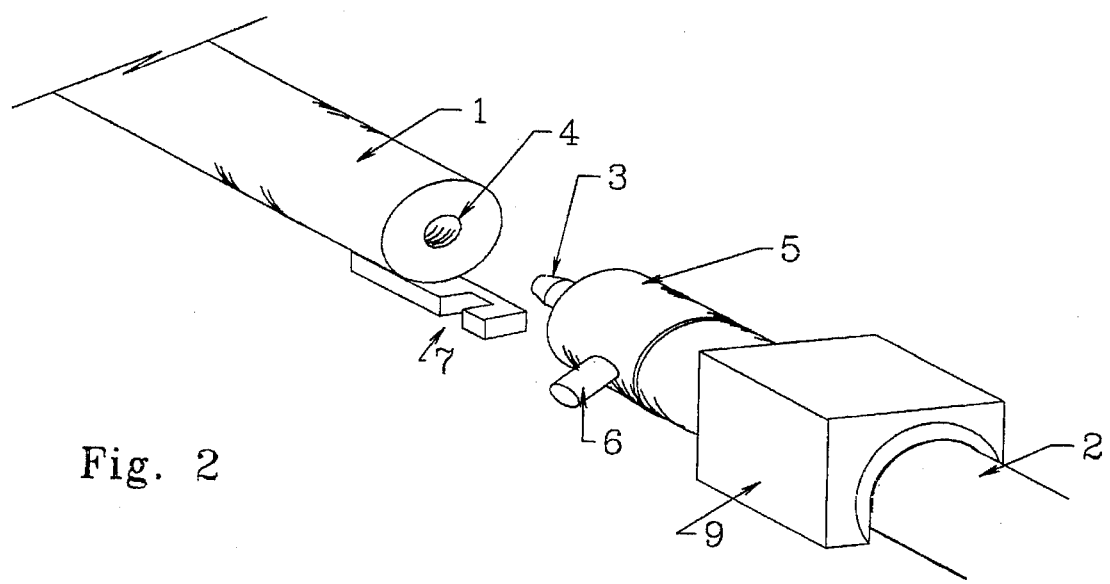
FIG. 2 is a view of the two shafts (unjoined) showing the receiving shaft with the receiving locking bracket.

The latch pin (6) serves a secondary and most important function. When the two shafts are not locked together, as shown in FIG. 1 and FIG. 2, the latch pin is positioned 30 degrees from the lock position. In this position it does not allow the linear bearing (9) to leave the shaft. Hence, the pallet is held on the shaft until it can be safely positioned into a second shaft for transfer.

Figure 4:
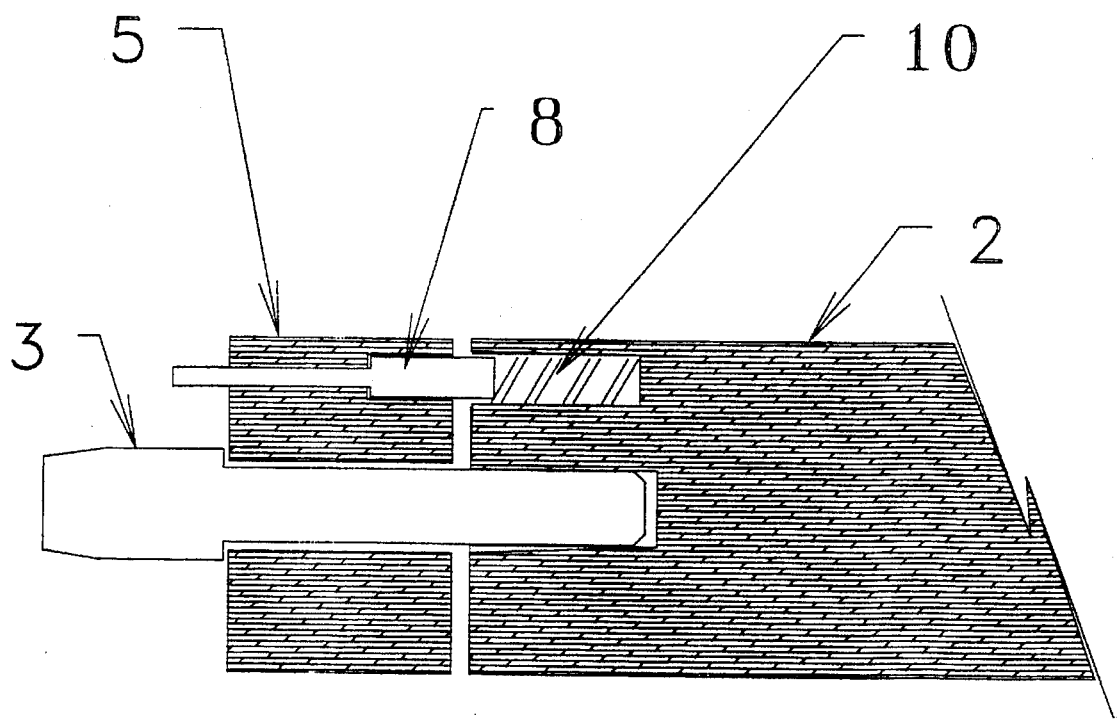
FIG. 4 is a cross section view of pivoting cylinder and retaining lock mechanism along line I—I of FIG. 1.

To prevent the pivoting cylinder (5), with the latch pin (6), from freely rotating to the open position, more clearly stated; aligned with the open slot in the bearing, a spring actuated cylinder locking pin (8), best viewed in cross section view identified as FIG. 4, is installed through pivoting cylinder (5), at the end of primary shaft (2). This pin is positioned parallel with the alignment pin (3) sticking out through the locking cylinder (5). The diameter of said pivoting pin (8) inside the cylinder (5) is larger than the portion outside the cylinder. A step groove inside the cylinder holds the cylinder in the locked position until the cylinder locking pin (8) is compressed. This can only be done by a second shaft (1) of equal dia. to (2) w/receiving hole (4). When the smaller portion of the cylinder locking pin (8) is inside the pivoting cylinder (5), the step groove can now pass over the locking pin (8) and said cylinder (5) is free to be pivoted to lock into latch bracket (7), locking the two shafts (1) and (2) together.

Figure 5:
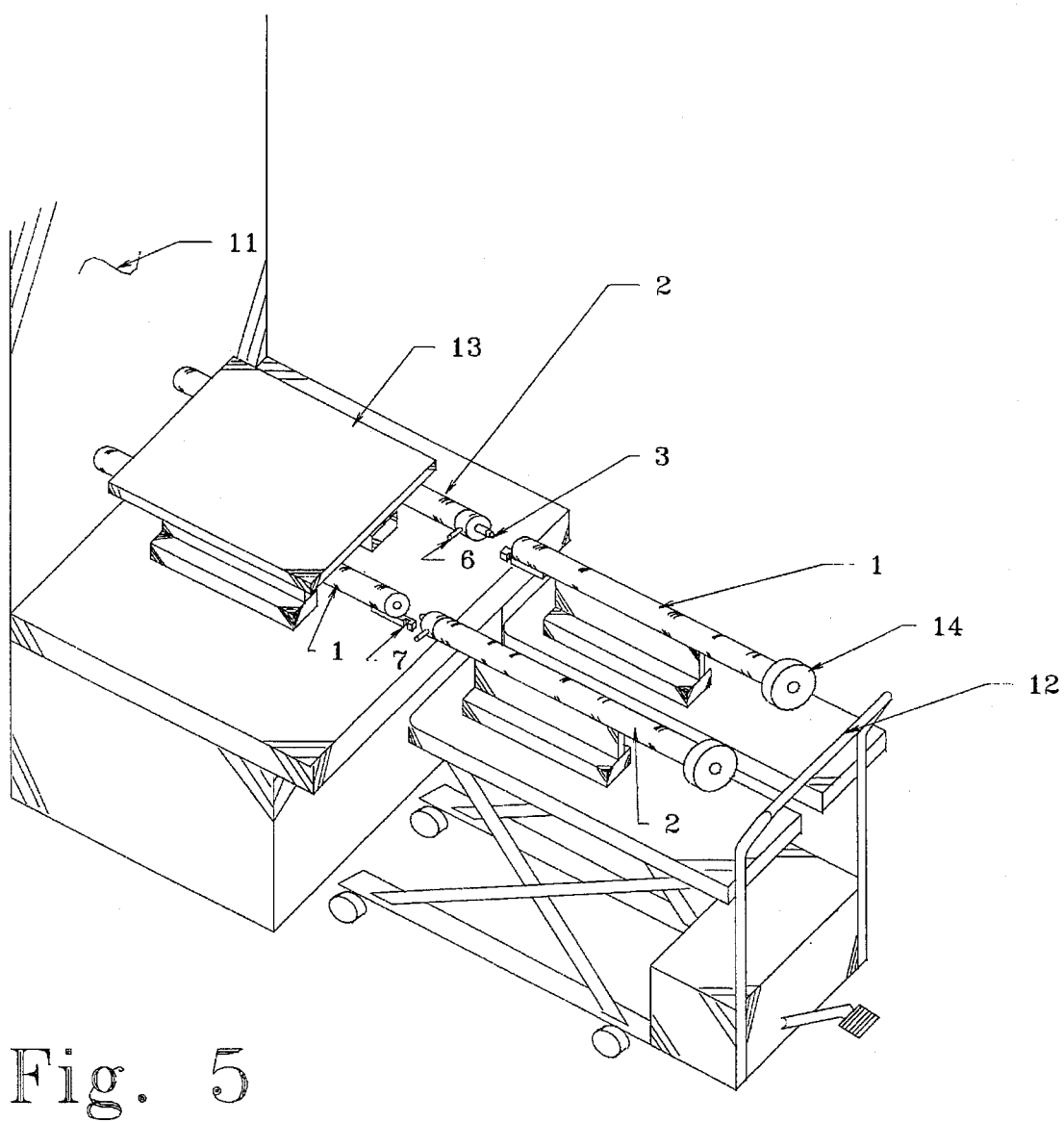
FIG. 5 displays a mobile cart being positioned to join shafts with a machining center, note locking cylinders on alternate shafts.

FIG. 5 shows how the invention can best be used to provide a means of transferring a load or pallet (13) held on shafts by open style linear bearings (9) from stationary position on a machining center (11) or assembly apparatus to a mobile cart (12) or lift to be moved to storage or use on a second machine. By alternating the location of shaft locking mechanism (6) one on said machining center (11) and one on cart (12) both devices safely hold pallet (13) on their respective shafts until the cart shafts are joined and locked with the shafts on said machining center (11).

I claim:
1. An apparatus for coupling two linear shafts concentrically together comprising:
   a first shaft having a stationary portion and a cylinder rotating about a center alignment pin, said center alignment pin protruding from said stationary portion and extending through said rotating cylinder, and said rotating cylinder including a retaining pin for locking said rotating cylinder against rotation and a latch pin located on a circumference of said rotating cylinder, said latch pin having a locked position and a blocking position; and
   a second shaft having a concentrically located guide hole for receiving said alignment pin and a slotted latch groove for receiving said latch pin when said latch pin is in said locked position to lock said first and second shafts together, wherein loads or pallets having linear bearings located on said first and second shafts can be transferred from one shaft to another without interference from said latch pin and said latch groove.

2. An apparatus according to claim 1, wherein when said latch pin is in said blocking position, said latch pin prevents said loads or pallets from being transferred from one shaft to another.

3. An apparatus according to claim 1, further comprising: said retaining pin having an enlarged base area and a narrow protruding area and being biased by a spring to extend through said rotating cylinder; said rotating cylinder having a hole through which said base area extends, wherein when said base area extends into said hole said latch pin is held in said blocking position and when said retaining pin is compressed by said second shaft said base area exits said hole permitting rotation of said rotating cylinder.

4. An apparatus for removing a pallet from a stationary unit to a mobile cart comprising:
   a mobile cart having first and second parallel linear shafts;
   a stationary unit having first and second parallel linear shafts to be joined with said mobile cart first and second parallel linear shafts;
   a first linear shaft of said mobile cart having a stationary portion and a cylinder rotating about a center alignment pin, said center alignment pin protruding from said stationary portion and extending through said rotating cylinder, and said rotating cylinder including a retaining pin for locking said rotating cylinder against rotation and a latch pin located on a circumference of said rotating cylinder, said latch pin having a locked position and a blocking position;
   a first linear shah of said stationary unit having a stationary portion and a cylinder rotating about a center alignment pin, said center alignment pin protruding from said rotating cylinder, and said rotating cylinder including a retaining pin for locking said rotating cylinder against rotation and a latch pin located on a circumference of said rotating cylinder, said latch pin having a locked position and a blocking position;
   a second linear shaft of said mobile cart having a concentrically located guide hole for receiving said alignment pin of said first linear shaft of said stationary unit and a slotted latch groove for receiving said latch pin of said first linear shaft of said stationary unit when said latch pin of said first linear shaft of said stationary unit is in said locked position to lock said first linear shaft of said stationary unit and second linear shaft of said mobile cart together, wherein loads or pallets having linear bearings located on said first linear shaft of said stationary unit or said second linear shaft of said mobile cart can be transferred between said first linear shaft of said stationary unit and second linear shaft of said mobile cart without interference from said latch pin of said stationary unit and said latch groove of said mobile cart; and a second linear shaft of said stationary unit having a concentrically located guide hole for receiving said alignment pin of said first linear shaft of said mobile cart and a slotted latch groove for receiving said latch pin of said first linear shaft of said mobile cart when said latch pin of said first linear shaft of said mobile cart is in said locked position to lock said first linear shaft of said mobile cart and said second linear shaft of said stationary unit together, wherein loads or pallets having linear bearings located on said first linear shaft of said mobile cart or said second linear shaft of said stationary unit can be transferred between said first linear shaft of said mobile cart and second linear shaft of said stationary unit without interference from said latch pin of said mobile cart and said latch groove of said stationary unit.

\* \* \* \* \*